United States Patent [19]

Geczy

[11] Patent Number: 5,527,220
[45] Date of Patent: Jun. 18, 1996

[54] ARTICULATABLE JOINT WITH MULTI-FACETED BALL AND SOCKET

[75] Inventor: Bela A. Geczy, Spring, Tex.

[73] Assignee: Halliburton Company, Dallas, Tex.

[21] Appl. No.: 216,919

[22] Filed: Mar. 23, 1994

[51] Int. Cl.$^6$ ........................................... F16D 3/16
[52] U.S. Cl. .......................................... 464/153; 464/147
[58] Field of Search .............................. 464/106, 153, 464/147, 159, 154, 158, 7, 16; 418/48

[56] References Cited

U.S. PATENT DOCUMENTS

| | | | |
|---|---|---|---|
| 797,820 | 8/1906 | Peck | 464/106 X |
| 899,913 | 9/1908 | Shaw | 464/153 |
| 1,311,679 | 7/1919 | Chalifoux | 464/106 |
| 1,732,354 | 10/1929 | Cooper | 464/153 |
| 1,838,310 | 12/1931 | Hubbel | 464/15 |
| 1,892,217 | 12/1932 | Moineau . | |
| 2,354,184 | 7/1944 | Daniel | 464/106 |
| 3,260,069 | 7/1966 | Neilson et al. . | |
| 3,359,757 | 12/1967 | Adams | 464/159 |
| 3,405,540 | 10/1968 | Johnson | 464/106 X |
| 3,612,734 | 10/1971 | Dawson et al. | 418/48 |
| 4,029,368 | 6/1977 | Tschirky et al. | 308/8.2 |
| 4,034,574 | 7/1977 | Kuder | 464/106 |
| 4,098,561 | 7/1978 | Tschirky et al. . | |
| 4,140,444 | 2/1979 | Aolen | 418/48 |
| 4,157,022 | 6/1979 | Crase | 64/32 R |
| 4,220,380 | 9/1980 | Crase et al. . | |
| 4,299,295 | 11/1981 | Geczy | 175/65 |
| 4,592,427 | 6/1986 | Morgan | 166/369 |
| 4,599,056 | 7/1986 | Crase | 418/48 |
| 4,636,151 | 1/1987 | Eppink | 418/48 |
| 4,667,751 | 5/1987 | Geczy et al. | 175/61 |
| 4,679,638 | 7/1987 | Eppink | 175/107 |
| 4,968,287 | 11/1990 | Jacob | 464/145 |
| 5,007,880 | 4/1991 | Walker | 464/169 |
| 5,048,622 | 9/1991 | Ide | 175/107 |
| 5,073,145 | 12/1991 | Retzokwski et al. | 464/157 |
| 5,159,400 | 8/1992 | Ide | 418/48 |
| 5,288,271 | 2/1994 | Nelson et al. | 464/147 X |

FOREIGN PATENT DOCUMENTS

| | | | |
|---|---|---|---|
| 663625 | 7/1938 | Germany | 464/153 |
| 2084697 | 4/1982 | United Kingdom . | |
| 2152588 | 8/1985 | United Kingdom . | |

Primary Examiner—Daniel P. Stodola
Assistant Examiner—Eileen A. Dunn
Attorney, Agent, or Firm—Conley, Rose & Tayon

[57] ABSTRACT

An articulatable joint which is embodied within a coupling useful for transferring eccentric rotational energy and motion into concentric rotational energy and motion. The coupling is incorporated into a downhole drill string and applied to connect a motor section to a drill bit shaft within a drill string. The coupling comprises generally a housing section and two associated end sections which each feature a proximate base portion, adapted to permit the end sections to be connected within the housing, an intermediate neck, and a generally rounded head extending in a distal relation to the base and neck. Each head presents a thrust bearing face and a number of longitudinally arcuate contact faces. The housing section contains recesses adapted to receive and partially enclose the heads of the end sections in a generally complimentary manner. When inserted into their respective recesses, the end sections are afforded limited angular translation along angles departing from the axial centerline of the housing section while rotation of the head portion within the recess is limited by contact between the contact faces of the head portion and complimentary contact areas within the recess.

20 Claims, 4 Drawing Sheets

ARTICULATABLE JOINT WITH MULTI-FACETED BALL AND SOCKET

BACKGROUND OF THE INVENTION

1. Field of the Invention

The present invention relates generally to an articulable joint which will permit angular translation between two jointed sections and transmission of torque along the length of the jointed sections. The joint may be incorporated into a joint assembly which is useful for transferring eccentric rotational energy and motion into concentric rotational energy and motion. In a described embodiment, the invention has application as a coupling to be incorporated into a downhole drilling device. In particular, the coupling is applied to connect a motor section to a drill bit shaft.

2. Description of Related Art

In many mechanical devices, there is a need to interconnect adjoining members so that axial rotation can be transferred from one member to the other while angular translation of one member with respect to the other is permitted at the connection point. Articulable joints and joint assemblies have been known which are operable to provide this type of flexible motion between the connected members. Perhaps the most well known designs of this type are universal joints which consist of forked arm sections joined with a spider element, the link pins of which engage eyelets in the arms. However, these designs are not generally sufficient for transfer of high torque and thrust loads.

Joint assemblies which incorporate such articulable joints are often employed when it is desired to convert rotation from an eccentrically moving member to a concentrically rotatable member. For example, rotation of the drill bit is imparted by a downhole motor assembly. The motor assembly itself typically includes a rotor portion which moves in an eccentrically rotating manner within a stationary stator section. However, the motor assembly must be coupled or otherwise associated with the bit such that the eccentric motion of the rotor imparts concentric motion to the bit. Many contemporary drill strings employ what is commonly known as a lobe coupling to perform this function. This type of connector utilizes a pair of universal joints which connect a straight connecting rod to the rotor and to the bit shaft. Unfortunately, the universal joint sections are designed to transfer largely torsional loads and are relatively poorly suited to handle significant hydraulic thrust-type loading. As a result, lobe couplings must typically be repaired or replaced after 70–80 hours of operation. The expenses associated with removing the drill string from the well and downtime for the well are often significant.

Alternative designs have been developed in attempts to improve coupling life. Connector designs are known in which a flexible rod extends between the rotor and the shaft for translating the torque and eccentric motion of the rotor to the concentrically supported bit drive shaft. In one such design, the rod has an upset section on each end, and upper and lower connections connect the upset sections of the rod to the rotor and to the shaft. The connections are non-integral to the rod and can be made from a different material from the rod.

A design is also known wherein a torsion bar is used to connect the rotor and the shaft and for translating the rotation and eccentric motion of the rotor to the concentric rotation of the bit shaft. Connection between the torsion bar and the rotor is disposed above the area of contact of helical teeth of the rotor with helical teeth of the stator. Preferably, for connecting the rotor to the torsion bar, the rotor is provided with a recess tapering upwardly and a through-slot disposed above this recess perpendicularly to its axis to communicate therewith. The torsion bar has a conical portion corresponding to the tapered recess of the rotor and terminating in a tailpiece of rectangular configuration received by the slot and having in cross-section dimensions corresponding to the dimensions of this slot.

Clearly, a joint and joint assembly design which is durable and strong is desirable. In addition, a drill string coupling is needed which is sufficiently sturdy and efficient for effective transfer of both torsional loading and hydraulic thrust-type loading.

SUMMARY OF THE INVENTION

By way of exemplary embodiment, an articulable joint, and joint assembly incorporating it, is described. In the described embodiment, the present invention comprises a coupling adapted to relate the rotor of a motor assembly to a bit drive shaft so that the eccentric rotational energy and motion of the rotor is converted efficiently into concentric rotational energy and motion. The coupling comprises generally a housing section and two associated end sections which may be articulated with respect to the housing. The end sections each feature a proximate base portion and connector, which permit the end sections to be connected within the housing, an intermediate neck, and a generally rounded head extending in a distal relation from the base and neck. At its distal point, each head presents a thrust bearing face which is adapted to receive and transmit a hydraulically induced thrust load. Extending proximally backward from the thrust bearing face are one or more longitudinally arcuate contact faces. The heads may be formed so that the contact faces are flat, concave or convex across their radial widths.

The housing section is generally cylindrical in shape and has two ends, each of which contain recesses adapted to receive and partially enclose the head portions of the end sections in a generally complimentary manner. In alternative preferred embodiments, the recesses may be formed with the internal axial walls being generally planar or arcuate. Each recess presents a thrust bearing load area which is complimentary to and adapted to adjoin the thrust bearing face of the head portion. The recesses also present contact areas which are generally complimentary to the longitudinally arcuate contact faces of the head portion. When inserted into their respective recesses, the end sections are afforded limited angular translation along angles departing from the axial centerline of the housing section. Rotation of the head within the recess is limited by contact between the contact faces of the head and the complimentary contact areas of the recess.

The coupling may be constructed in either an open arrangement, wherein the connections between each head and recess are exposed to drilling mud, or a closed arrangement wherein the connections are sealed from the mud. The closed arrangement permits active lubrication of the connections between the head and recesses.

In operation, the coupling allows flexible motion between the housing and end sections to permit efficient transfer of energy and motion from the motor assembly to the bearing assembly. Torsional and thrust loading is accommodated by the head/recess arrangement. During operational testing, couplings constructed in accordance with the present invention have performed reliably and demonstrated a significant increase in coupling life span over conventional designs.

DETAILED DESCRIPTION OF PREFERRED EMBODIMENTS

In a broad aspect, the invention describes an articulable joint and joint assembly. The articulable joint described herein permits angular displacement of joined members at the joint in a 360° range of directions. At the same time, the joint does not permit rotation of one joined member with respect to the other. The joint is therefore useful for axial transmission of rotational motion along joined members. The joint assembly described permits efficient conversion of eccentric rotational energy and motion into concentric rotational energy and motion.

Figure 1:
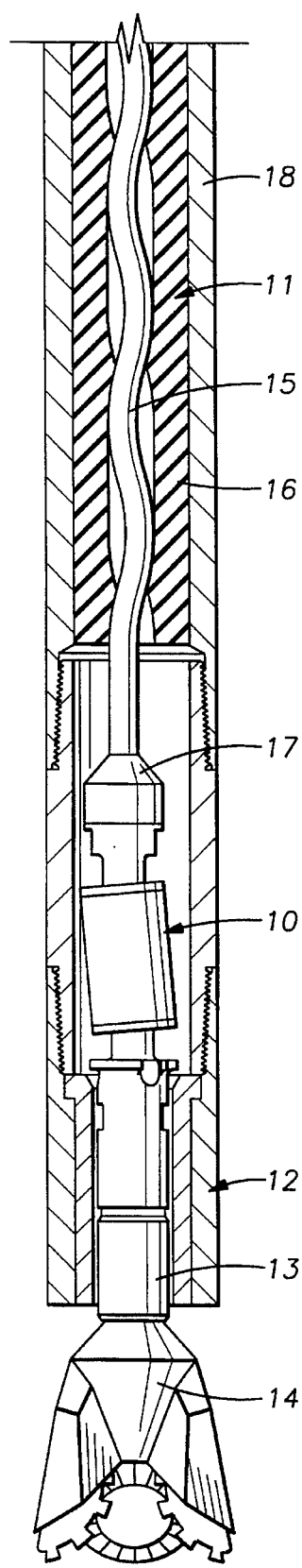
FIG. 1 shows a partial cross-sectional view of portions of an exemplary downhole motor and coupling constructed in accordance with the present invention.

In a primary embodiment illustrated in FIG. 1, wherein the lower portion of a drill string assembly is depicted, a coupling is shown generally at 10 which is designed to interconnect a downhole motor assembly 11 and a bit bearing assembly 12 containing a bit drive shaft 13 which supports a drilling bit 14.

The construction and operation of motor assembly 11 is well known and typically comprises an outer cylindrical housing 18 containing an elastomeric stator 16 and a rotor 15. The motor assembly 11 may be of the single or multiple lobe variety, referring in one respect to a number which is one less than the number of visible non-concentric cavities apparent from a cross sectional view of the stator. During operation of the motor assembly 11, rotation of the rotor 15 within the stator 16 causes the lower end of the rotor 17 to both rotate and gyrate in an eccentric manner with respect to the centerline of the drill string. The deviation of the centerline of the rotor 15 from the centerline of the housing 18 during operation is known as the amount of eccentricity of the motor assembly. Couplings have traditionally been required to convert this eccentric motion into concentric motion for rotation of the drive shaft 13.

Figure 2:
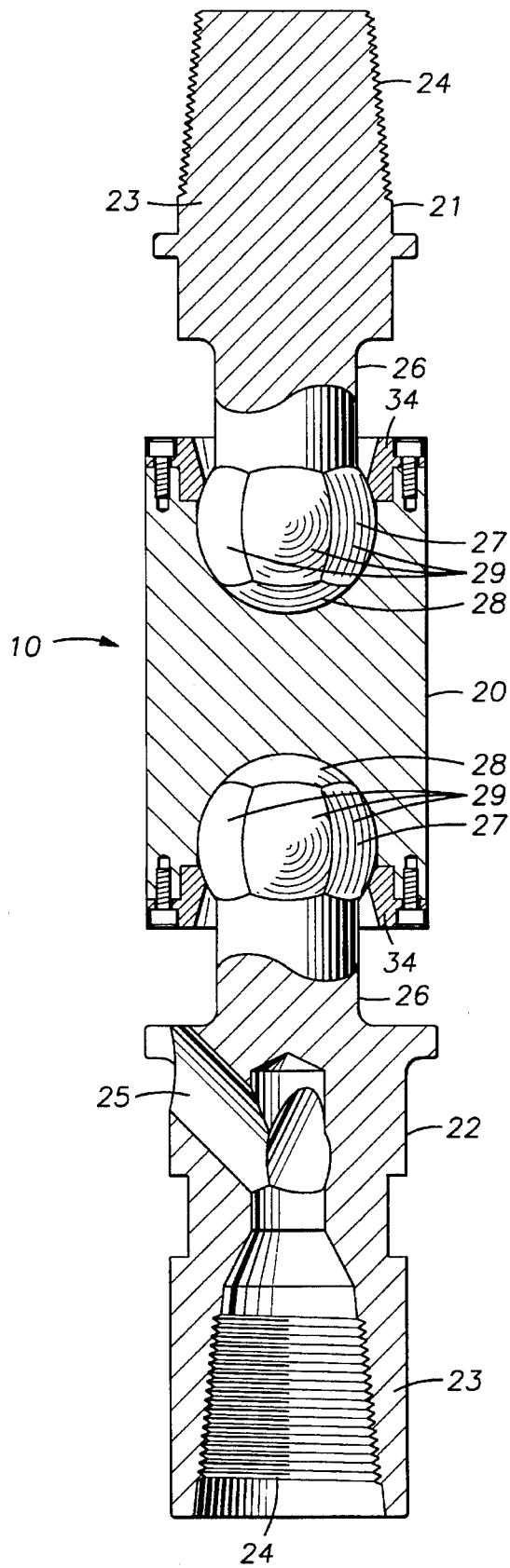
FIG. 2 is a cross-sectional view of an exemplary coupling 10 constructed in accordance with the present invention.

Referring now to FIG. 2, coupling 10 features a central housing section 20 and associated upper and lower end sections 21 and 22. Each end section has a proximate base portion 23, 23'. The base portion 23, 23' features a connector 24 which, by threading or other surface engagement adaptation means, permits the base portion 23 to be interconnected with an adjoining component in the drilling tool assembly. The upper end section 21 is designed to be fixedly attached to the lower end 17 of rotor 15 of motor assembly 11. The lower end section 22 is designed to be fixedly attached to the drive shaft 13 of the bearing assembly 12. A mud conduit 25 may be provided in lower end section 22 to permit transfer of drilling mud toward the bit 14 inside of the drive shaft 13.

Figure 6:
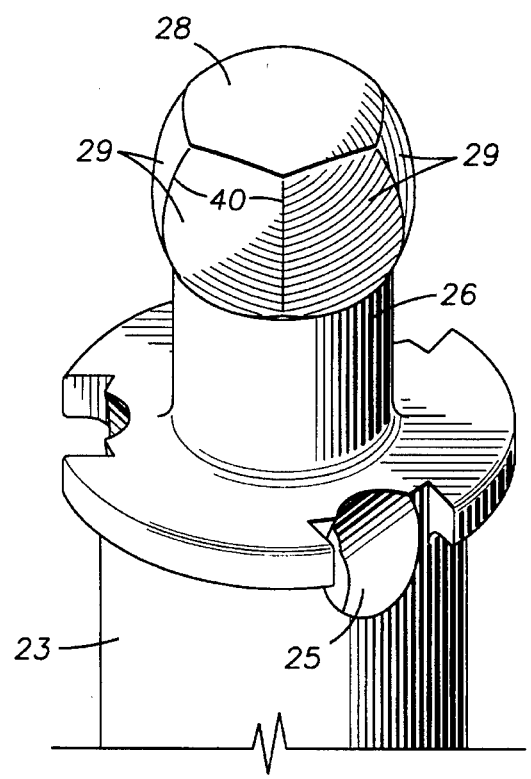
FIG. 6 depicts an exemplary design for a head from a perspective view.
Figure 10:
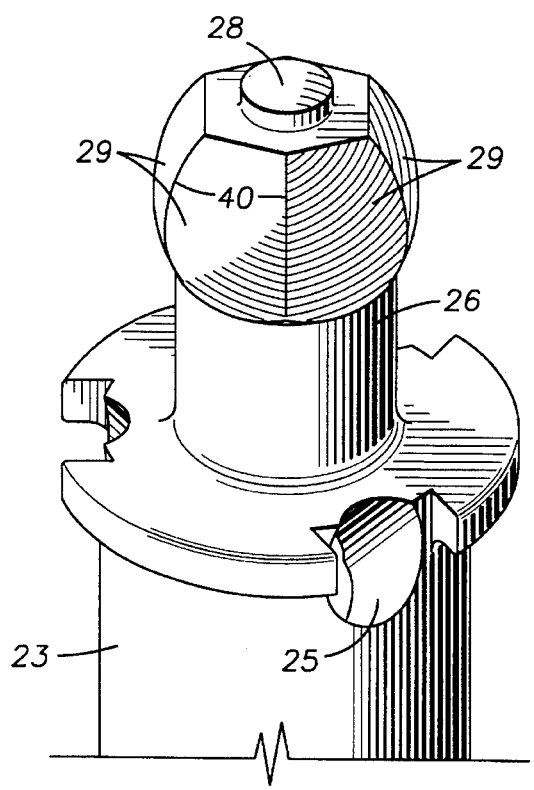
FIG. 10 depicts an alternative exemplary design for a head 27' from a perspective view.

Extending in an axially distal relation from the base portion 23, 23' of each end section is a neck 26 which terminates in a generally spherical head 27 and which extends between the base portion 23 and the head 27. Preferably, the neck 26 is smaller in radial circumference than the head 27. Alternative exemplary designs for head 27 are presented in FIGS. 6 and 10. Head 27 includes a plurality of convex surfaces or faces 28, 29. At its distal point, the head 27 presents a thrust bearing face 28 which is adapted to receive and transmit hydraulically-induced thrust loads to an adjoining component along the drill string. The thrust bearing face forms an arcuate surface such as a convex surface to generally match an adjoining arcuate surface such as a concave surface. Preferably, thrust bearing face 28 is rounded across its surface to correspond to a portion of a spherical shape having a common radius. It may be noted by comparison between FIGS. 6 and 10 that the thrust bearing face 28, 28' may be of variable size in area.

Extending proximally back from the distal thrust bearing face 28 along the radial surface of heads 27 are one or more longitudinally arcuate contact faces 29. Faces 29 extend longitudinally generally from a point proximate the thrust bearing face 28 and continue back toward the neck 26. It is preferred that there be a number of contact faces 29 which radially adjoin each other about the circumference of the head 27 to form ridges 40. This relationship may be best appreciated by reference to FIGS. 3–6 which illustrate an exemplary head. The contact faces 29 should be shaped to provide effective loading surfaces.

Figure 3:
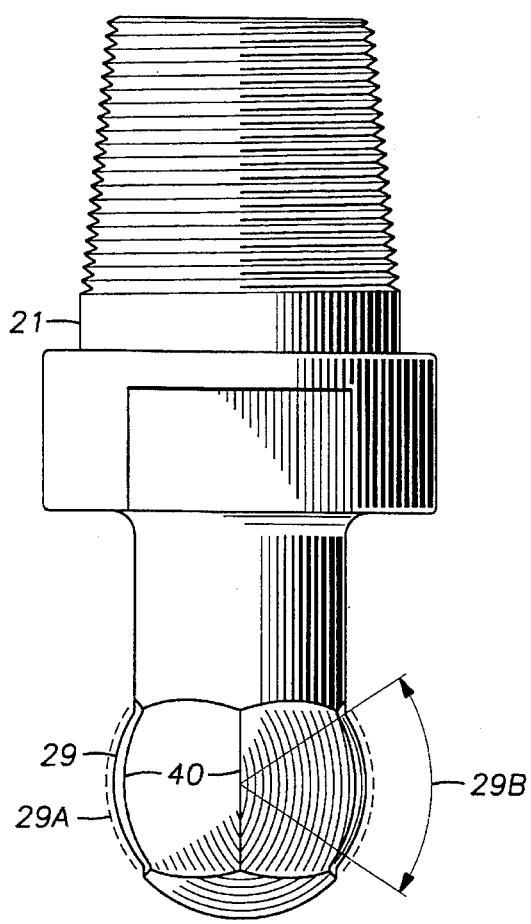
FIG. 3 is a side view of an exemplary end section indicating removal of portions of a spherical piece in forming contact faces 29.
Figure 4:
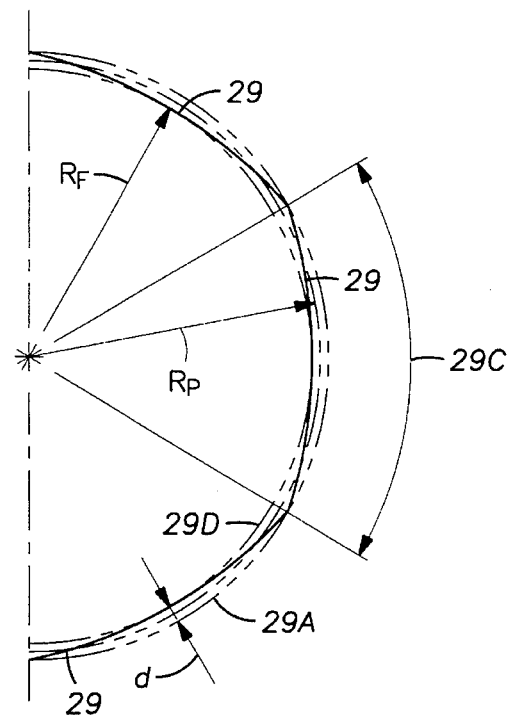
FIGS. 4 and 5 are details indicating an exemplary design for forming contact faces 29 with radially convex surfaces.

FIGS. 3 and 4 demonstrate one technique for forming contact faces 29 by removal of material from a spherical piece having an original surface indicated at phantom line 29A. The faces may be formed by milling or otherwise removing portions of a spherical piece. Each face 29 has a longitudinal dimension, indicated by 29B in FIG. 3, and a radial width, 29C in FIG. 4, which extends between adjacent ridges 40. In the depicted embodiment, faces 29 follow a relatively constant spherical radius curvature in the longitudinal direction (as shown at 29B in FIG. 3) and a flatter curvature in the circumferential direction perpendicularly transverse to the axis of head 27 and neck 26 as shown at 29C in FIG. 4. Thus, there is a greater curvature in the axial direction than in the transverse circumferential direction. The reduced curvature in the transverse circumferential direction allows the formation of arcuate ridges 40.

The faces 29 have a radius $R_F$ which is variable across the radial width 29C but which is always equal to or smaller than the radius of an imaginary circle (such as that at 29A in FIG. 4) which circumscribes the head. The radius $R_F$ is always equal to or larger than an imaginary circle which is enclosed within the circumscribing circle at a radial distance d. The surfaces across the radial widths 29C of faces 29 may be formed to be radially flat, concave or convex. To date, good results have been achieved in testing with faces which are convex across their radial widths.

Figure 5:
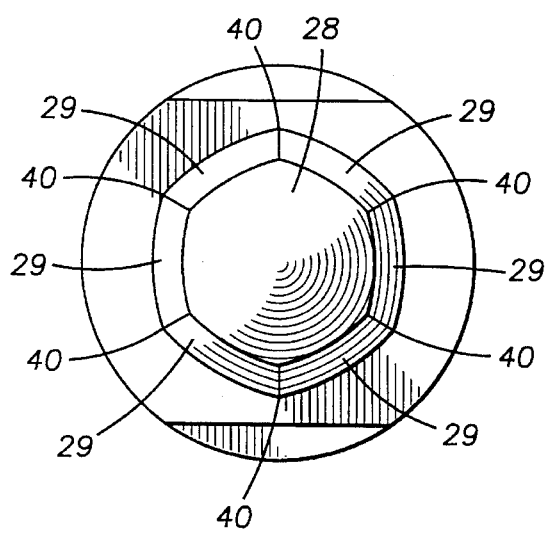

As FIG. 5 shows, an end view effectively reveals a polygonal shape for the adjoining radial widths 29C of the faces 29 such as a pentagon, hexagon and so forth. A particularly preferred embodiment for configuration of the radial widths of faces 29, featured in FIGS. 4 and 5, forms a hypocycloidal convex cross-sectional profile. The curvature for the surface of radial width 29C in FIG. 4 is governed by the following expression: $0<d/R_P<1/(N-1)^2$ where: d=radial distance between minimum and maximum points for pitch radius; $R_P$=pitch radius; N=number of polygon sides.

Figure 7:
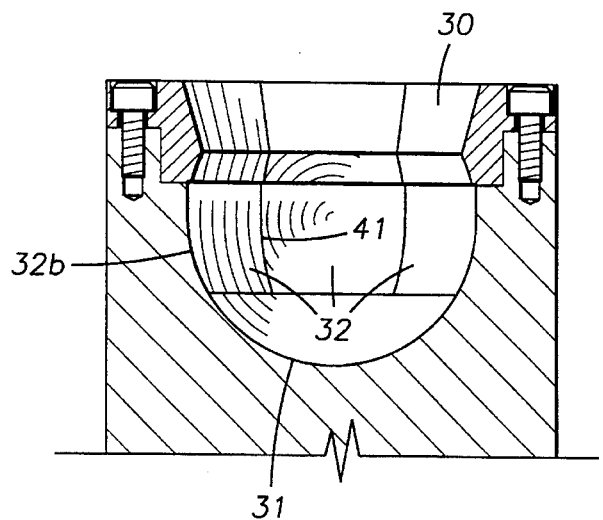
FIG. 7 is a cross-sectional view of a portion of an exemplary housing including a recess having longitudinally arcuate contact areas.

Referring now to FIG. 7, the housing section 20 is generally cylindrical and has two ends. Each end contains a socket or recess 30 which is generally complimentary to one of the heads 27 of the end sections 21, 22 such that the recess 30 may receive and partially enclose the head 27. Recess 30 includes a plurality of concave surfaces or areas 31, 32. Within each recess, a thrust bearing load area 31 is presented which is arcuately shaped to adjoin in a complimentary manner the rounded thrust bearing face 28 of an inserted head 27. Thus, concave areas 31, 32 engage convex surfaces 28, 29.

Figure 9:
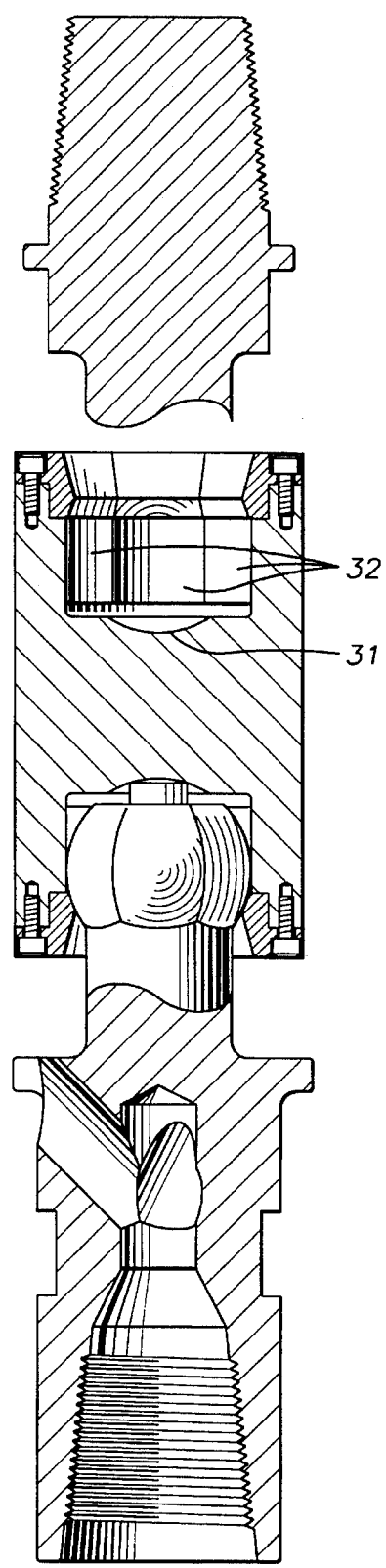
FIG. 9 depicts a construction of the exemplary coupling wherein portions of the upper end section have been removed and the recess features generally planar contact areas.

The internal radial walls of each recess present radial contact areas 32 shaped to be generally complimentary to the longitudinally arcuate contact faces 29 of an inserted head 27. Two alternate preferred embodiments for the recess 30 are shown in FIGS. 9 and 7. FIG. 7 illustrates one embodiment for recess 30 wherein the contact areas 32 are longitudinally arcuately shaped. Areas 32 have a generally spherical to conical curvature in the axial direction from face 28 of head 27 toward neck 26 as shown at 32B in FIG. 7 and a flatter, less spherical curvature with a pitch radius slightly greater than $R_P$ in the circumferential direction perpendicularly transverse to the axis of head 27 and neck 26. There is a greater curvature in the axial direction than in the transverse circumferential direction. The reduced curvature in the transverse circumferential directions allows the formation of arcuate crevices or grooves 41. FIG. 9 illustrates an alternative coupling with portions of the upper end section removed to better show the recess 30'. In this embodiment, it is noted that the contact areas 32' are formed as relative planes. The thrust bearing load area 31', however, is arcuate or concave in shape. This type of recess 30 may be preferable from the standpoint of ease of manufacture.

Figure 8:
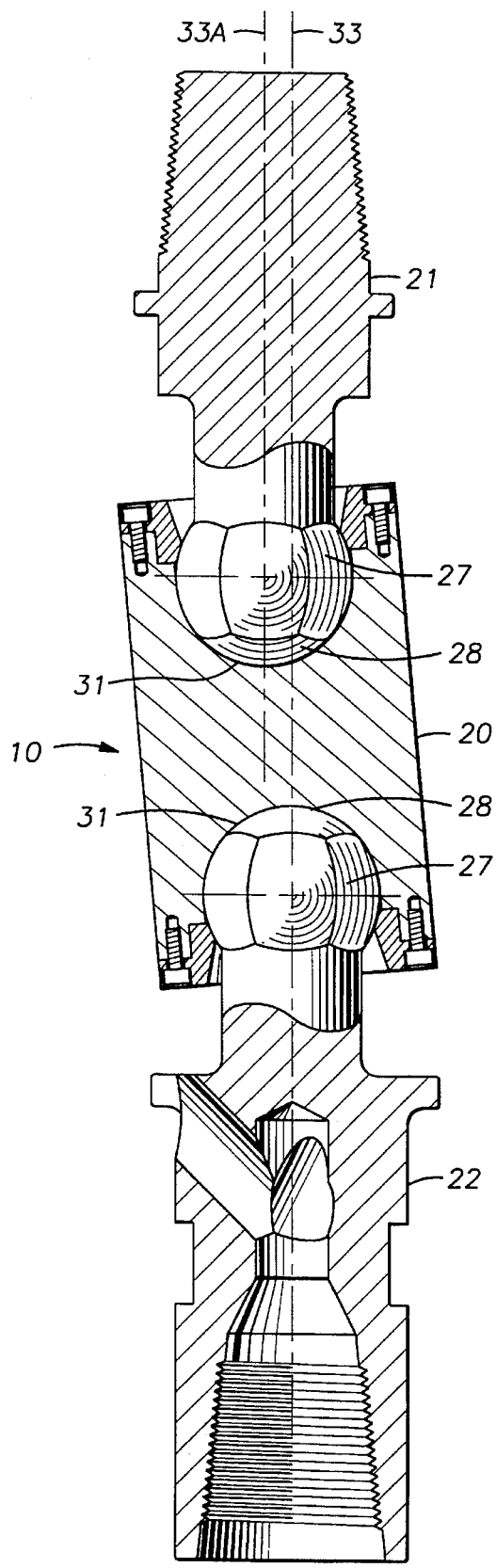
FIG. 8 shows an exemplary coupling with the housing and end sections articulated.

The articulable relationship between an inserted head 27 and its respective recess 30' is depicted in FIG. 8. The thrust bearing face 28 of the head 27 will contact and adjoin the thrust bearing load area 31 within the recess 30 while the contact faces 29 of the head 27 lie adjacent the contact areas 32 within the recess 30. Ridges 40 are received within grooves 41. It is highly preferred that the head 27 and recess 30 be sized such that a small separation or gap remains between the contact faces and contact areas upon insertion of the head. The separation should be sufficient to permit the contact faces 29 to slide longitudinally and with relative ease with respect to the contact areas 32 within the recess. The precise amount of separation might be set in accordance with manufacturing tolerances for mechanical parts of this nature. The separation will thus permit the head 27 to be easily inserted and removed from the recess 30 and also allow portions of the coupling 10 to be translated from the axial centerline of the motor housing 33 by articulating the end sections 21, 22 with respect to the housing 20. The upper end section 21 may be axially displaced (see centerline 33A in FIG. 8) to accommodate the eccentric movement of the lower portion of the rotor 17.

The separation between the inserted head 27 and its respective recess 30 should not, however, be large enough to permit the head 27 to rotate axially (i.e., rotation about its central longitudinal axis) within the recess 30 with respect to the housing 20. Axial rotation should be limited by contact between the contact faces 29 of the head 27 and the complimentary axial contact areas 32 of the recess 30.

Referring once again to FIG. 2, a securing mechanism 34 is shown which interconnects with portions of the housing 20 and may be secured to maintain the head 27 in an inserted position within the recess 30. The securing mechanism 34 is preferably annularly shaped and sized to surround the neck 26 of an end section. The interconnection between the securing mechanism 34 and the housing 20 may be accomplished by means of threading, bolting or other known connection means. A preferred design for the securing mechanism from the standpoint of ease of assembly and disassembly is a split-ring flange which may be bolted to the housing 20. It is noted that the interior circumference of the securing mechanism 34 is radially chamfered, Or otherwise tapered to prevent the securing mechanism 34 from interfering with angular displacement of an end section with respect to the housing 20.

Figure 11:
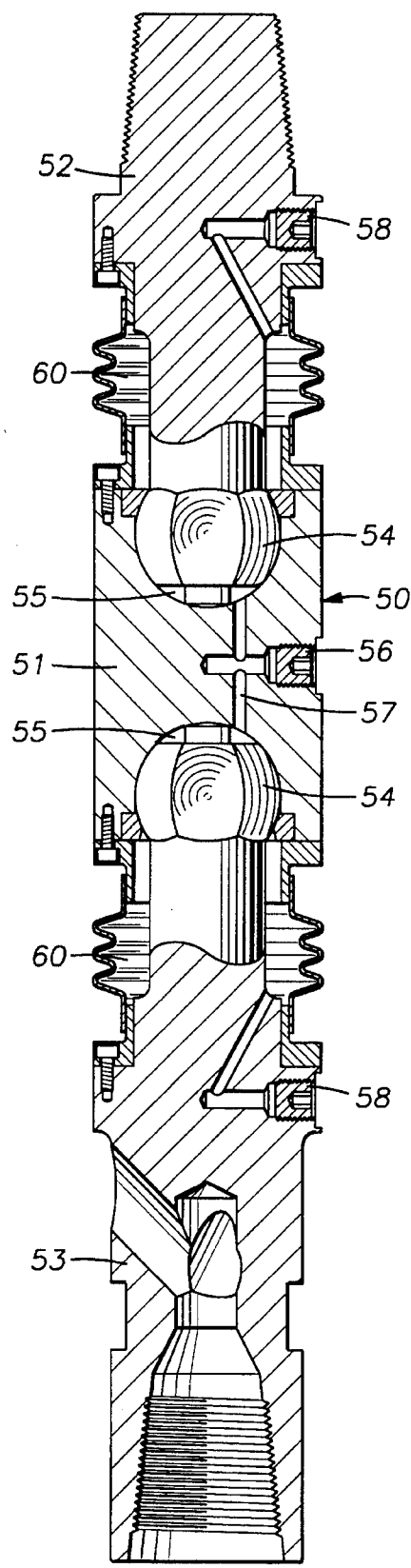
FIG. 11 illustrates an exemplary coupling 50 featuring sealed connections between the housing and end sections.

Turning now to FIG. 11, an exemplary coupling 50 is illustrated which is similar in most respects to coupling 10 but features sealed connections between the housing 51 and end sections 52, 53. In this version of the invention, outer annular seals 60 radially surround portions of the housing 51 and end sections 52, 53 to shield the connection of head 54 and recess 55 from exposure to drilling mud which is present in the annulus surrounding the drill string. A suitably sized bellows component may be employed to effect the seal between a housing 51 and end sections 52, 53. Such components are well known in the art.

Sealing the head/recess connection against mud permits the connection to be lubricated with oil or a similar substance during a downhole drilling operation to prolong the life of the coupling. An arrangement for accomplishing lubrication is shown wherein an exemplary inlet port 56 and conduit 57 are incorporated into the housing. The inlet port 56 preferably includes a controllable valve which permits it to be opened or closed and may be threaded to permit the connection of a lube line (not shown) to supply lubricant. The inlet port 56 and conduit 57 permit a lubricant to be introduced from the radial exterior of the housing and into the recesses 55. Outlet ports 58 are incorporated into one or both of the end sections 52, 53 and permit liquid communication from an area proximate the neck to the radial exterior of the end section. The outlet ports 58, as well, preferably include a controllable valve which permit them to be opened or closed or a one-way valve. To lubricate the coupling 50, lubricant should be introduced into the recesses 55 and areas enclosed by the seals 60 (these areas are indicated generally at 59) via the inlet port 56 and conduit 57. Air displaced by introduction of the lubricant may be released through the outlet ports 58.

The ability of the end sections 21 and 22 to be articulated angularly with respect to the housing 20, provides the coupling with the necessary flexibility between the housing 20 and end sections 21 and 22 to receive eccentric motion and energy from the rotor 15 and translate it into concentric motion and energy to drive the bit drive shaft 13. For this reason, the amount of radial chamfering for the interior circumference of the securing mechanism 34 must be adequate to permit sufficient angular articulation of an end section with respect to the housing as dictated by the amount of eccentricity of the motor assembly 11.

A coupling constructed in accordance with the present invention serves during operation to transfer both downwardly acting hydraulic thrust loads and torque from the motor assembly downward toward a bit. Hydraulic thrust-type loading is exerted vertically downward and will be transferred along the drill string toward the bit 14. Thrust load is exerted by the rotor 15 upon the upper end section 20. It is then transmitted through the housing 20 toward the bit drive shaft 13 via the interface of the thrust bearing faces 28 and their adjoining thrust bearing load areas 31. Torque induced by rotation of the rotor 15 will be transmitted by the coupling 10 toward the bit 14. Torsional loads are transferred through the contact faces 29 of the head 27 of the upper end section 21 via the upper contact areas 32 of the housing to the housing 20 itself. The torsional load is further transferred through the lower contact areas 32 of the housing via the contact faces 29 of the lower end section to the lower end section 22 itself where it will act to rotate the bit drive shaft 13.

Operational testing to date has demonstrated that couplings constructed in accordance with the present invention perform reliably and at a significant increase in coupling life span over conventional designs. In one recent test, such a coupling was operated in a test for between 70–80 hours and then removed and inspected. The coupling was slightly worn but able to be replaced for additional operation.

While the invention has been described with respect to certain preferred embodiments, it should be apparent to those skilled in the art that it is not so limited. For example, a joint or joint assembly of the type described above may be applied to uses with vehicles, industrial or manufacturing equipment, household appliances or any of a great number of other devices. Those skilled in the art will also recognize that various modifications may be made without departing from the spirit and scope of the invention.

What is claimed is:

1. An articulable joint adapted to transmit rotational motion, said joint comprising:
    a. a first section having a distal end and a proximate base end;
    b. a generally spherical head at the distal end of said first section, said head having a distal end and a base end and comprising:
        1) a thrust bearing face at the distal end of said head adapted to adjoin and contact a thrust bearing load area which is generally complimentary to the thrust bearing face;
        2) a longitudinally arcuate contact face which extends generally from a point near the thrust bearing face proximately back toward the base end, said contact face being shaped to contact and adjoin a radial contact area which is generally complimentary to the longitudinally arcuate contact face;
    c. a second section adapted to be axially interconnected to the head of said first section, said second section forming a generally cylindrical housing having two ends;
    d. a recess within one end of the second section adapted to receive said head in a generally complimentary fashion, said recess comprising:
        1) the thrust beating load area shaped to contact and adjoin in a complimentary manner the thrust bearing face of the inserted head;
        2) an internal radial wall presenting the radial contact area shaped to adjoin in a generally complimentary manner the longitudinally arcuate contact face of the inserted head.

2. The joint of claim 1 wherein the first section further comprises a neck connecting the head to the base portion, the neck being smaller in radial circumference than the head.

3. The joint of claim 2 further comprising a securing mechanism which interconnects with portions of the second section and maintains said head in an inserted position within said recess.

4. The joint of claim 3 wherein the securing mechanism is annularly shaped and sized to surround the neck of the first section.

5. The joint of claim 1 wherein the head presents multiple contact faces which circumferentially surround the head and adjoin each other along the circumference of the head.

6. The joint of claim 1 further comprising a connector near the base portion of the first section suitable for fixedly connecting the first section to an adjoining body.

7. A joint assembly interconnectable between a means for generating rotating and gyrating motion and a rotatable assembly, said joint assembly operable to transmit eccentric rotation into concentric rotation and comprising:
    a. a pair of end sections, said end sections each having a distal end and proximate base end;
    b. a generally spherical head at the distal end of each said end section, said head having a distal end and a base end and comprising:
        1) a thrust bearing face at the distal end of said head adapted to adjoin and contact a thrust bearing load area which is generally complimentary to the thrust bearing face;
        2) a longitudinally arcuate contact face which extends generally from a point near the thrust bearing face proximately back toward the base end;
    c. a generally cylindrical housing section adapted to axially interconnect to the heads of said end sections, said housing section having two ends;
    d. a recess within each end of the housing section, each said recess adapted to receive a head in a generally complimentary fashion, each said recess comprising:
        1) the thrust bearing load area shaped to contact and adjoin in a complimentary manner the thrust bearing face of the inserted head;
        2) an internal radial wall presenting an axial contact area shaped to adjoin in a complimentary manner the longitudinally arcuate contact face of the inserted head.

8. The joint assembly of claim 7 wherein each said end section further comprises a neck connecting the head to the base portion, the neck being smaller in radial circumference than the head.

9. The joint assembly of claim 8 further comprising a securing mechanism which interconnects with portions of the housing and maintains said head in an inserted position within said recess.

10. The joint assembly of claim 9 wherein the securing mechanism is annularly shaped and sized to surround the neck of an end section.

11. The joint assembly of claim 7 wherein each of said heads further comprise multiple contact faces which circumferentially surround the head and adjoin each other along the circumference of the head.

12. The joint assembly of claim 7 wherein the base portion of an end section includes a connector suitable for fixedly connecting the end section to an adjoining body.

13. A coupling for use in a subterranean drilling assembly operable to connect a motor assembly to a bit bearing assembly and transmit rotational motion therebetween, said coupling comprising:
    a. a pair of end sections, said end sections each having a distal end and proximate base end;

b. a generally spherical head at the distal end of each said end section, said head having a distal end and a base end and comprising:
  1) a thrust bearing face at the distal end of said head adapted to adjoin and contact a thrust bearing load area which is generally complimentary to the thrust bearing face;
  2) a longitudinally arcuate contact face which extends generally from a point near the thrust bearing face proximately back toward the base end;
c. a generally cylindrical housing section adapted to axially interconnect to the heads of said end sections, said housing section having two ends;
d. a recess within each end of the housing section, each said recess adapted to receive a head in a generally complimentary fashion, each said recess comprising:
  1) the thrust bearing load area shaped to contact and adjoin in a complimentary manner the thrust bearing face of the inserted head;
  2) an internal radial wall presenting an axial contact area shaped to contact and adjoin in a complimentary manner the longitudinally arcuate contact face of the inserted head.

14. The coupling of claim 13 wherein each said end section further comprises a neck connecting the head to the base portion, the neck being smaller in radial circumference than the head.

15. The coupling of claim 14 further comprising a securing mechanism which interconnects with portions of the housing and maintains said head in an inserted position within said recess.

16. The coupling of claim 15 wherein the securing mechanism is annularly shaped and sized to surround the neck portion of an end section.

17. The coupling of claim 13 wherein each of said heads present multiple contact faces which circumferentially surround the head and adjoin each other along the circumference of the head.

18. The coupling of claim 13 wherein the base portion of an end section includes a connector suitable for fixedly connecting the end section to an adjoining body.

19. The coupling of claim 13 further comprising an outer annular seal radially surrounding portions of the housing section and an end section.

20. The coupling of claim 19 further comprising a ported conduit within the housing which permits fluid communication between one or more of said recesses and an area radially surrounding the housing.

* * * * *

UNITED STATES PATENT AND TRADEMARK OFFICE
CERTIFICATE OF CORRECTION

PATENT NO. : 5,527,220
DATED : June 18, 1996
INVENTOR(S) : Bela A. Geczy

It is certified that error appears in the above-indentified patent and that said Letters Patent is hereby corrected as shown below:

Column 7, claim 1, line 58, delete the word "beating" and replace it with -- bearing --.

Signed and Sealed this

Seventeenth Day of September, 1996

Attest:

BRUCE LEHMAN

*Attesting Officer*     *Commissioner of Patents and Trademarks*